(12) United States Patent
Sutskever et al.

(10) Patent No.: US 10,657,435 B1
(45) Date of Patent: May 19, 2020

(54) PROCESSING INPUTS USING RECURRENT NEURAL NETWORKS

(71) Applicant: Google LLC, Mountain View, CA (US)

(72) Inventors: Ilya Sutskever, Mountain View, CA (US); Wojciech Zaremba, Kluczbork (PL)

(73) Assignee: Google LLC, Mountain View, CA (US)

( * ) Notice: Subject to any disclaimer, the term of this patent is extended or adjusted under 35 U.S.C. 154(b) by 1154 days.

(21) Appl. No.: 14/877,096

(22) Filed: Oct. 7, 2015

Related U.S. Application Data

(60) Provisional application No. 62/061,011, filed on Oct. 7, 2014.

(51) Int. Cl.
*G06N 3/04* (2006.01)
*G06N 3/08* (2006.01)

(52) U.S. Cl.
CPC ............... *G06N 3/04* (2013.01); *G06N 3/08* (2013.01)

(58) Field of Classification Search
None
See application file for complete search history.

(56) References Cited

U.S. PATENT DOCUMENTS 5,146,541 A * 9/1992 Speidel ............ G06K 9/00523
706/22
2017/0322873 A1* 11/2017 Morris ............... G06F 11/3684

OTHER PUBLICATIONS

Schuster, Mike, and Kuldip K. Paliwal. "Bidirectional recurrent neural networks." IEEE Transactions on Signal Processing45.11 (1997): 2673-2681. (Year: 1997).*
Graves, Alex, and Jürgen Schmidhuber. "Framewise phoneme classification with bidirectional LSTM and other neural network architectures." Neural networks 18.5-6 (2005): 602-610. (Year: 2005).*
Sutskever, Ilya, James Martens, and Geoffrey E. Hinton. "Generating text with recurrent neural networks." Proceedings of the 28th International Conference on Machine Learning (ICML-11). 2011. (Year: 2011).*
Frasconi, Paolo, Marco Gori, and Giovanni Soda. "Recurrent neural networks and prior knowledge for sequence processing: A constrained nondeterministic approach." Knowledge-Based Systems 8.6 (1995): 313-332. (Year: 1995).*
Sutskever, Ilya, Oriol Vinyals, and Quoc V. Le. "Sequence to sequence learning with neural networks." Advances in neural information processing systems. 2014. (Year: 2014).*
Graves, "Generating Sequences with Recurrent Neural Networks," Jun. 5, 2014 [online] (retrieved from http://arxiv.org/abs/1308.0850v5), 43 pages.

* cited by examiner

*Primary Examiner* — Daniel T Pellett
(74) *Attorney, Agent, or Firm* — Fish & Richardson P.C.

(57) ABSTRACT

Methods, systems, and apparatus, including computer programs encoded on computer storage media, for processing an input sequence using a recurrent neural network to generate an output for the input sequence. One of the methods includes receiving the input sequence; generating a doubled sequence comprising a first instance of the input sequence followed by a second instance of the input sequence; and processing the doubled sequence using the recurrent neural network to generate the output for the input sequence.

18 Claims, 2 Drawing Sheets

PROCESSING INPUTS USING RECURRENT NEURAL NETWORKS

CROSS-REFERENCE TO RELATED APPLICATION

This application claims priority to U.S. Provisional Application No. 62/061,011, filed on Oct. 7, 2014. The disclosure of the prior application is considered part of and is incorporated by reference in the disclosure of this application.

BACKGROUND

This specification relates to processing input using recurrent neural networks.

Neural networks are machine learning models that employ one or more layers of models to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output, e.g., an output sequence, from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

In general, one innovative aspect of the subject matter described in this specification can be embodied in methods for processing an input sequence using a recurrent neural network to generate an output for the input sequence that include the actions of receiving the input sequence; generating a doubled sequence comprising a first instance of the input sequence followed by a second instance of the input sequence; and processing the doubled sequence using the recurrent neural network to generate the output for the input sequence.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Particular embodiments of the subject matter described in this specification can be implemented so as to realize one or more of the following advantages. By processing doubled sequences instead of original sequences using a recurrent neural network to generate outputs for the original sequences, the accuracy of the outputs generated by the recurrent neural network can be improved. By providing the recurrent neural network doubled sequences instead of original sequences while training the recurrent neural network, the effectiveness of the training can be improved.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
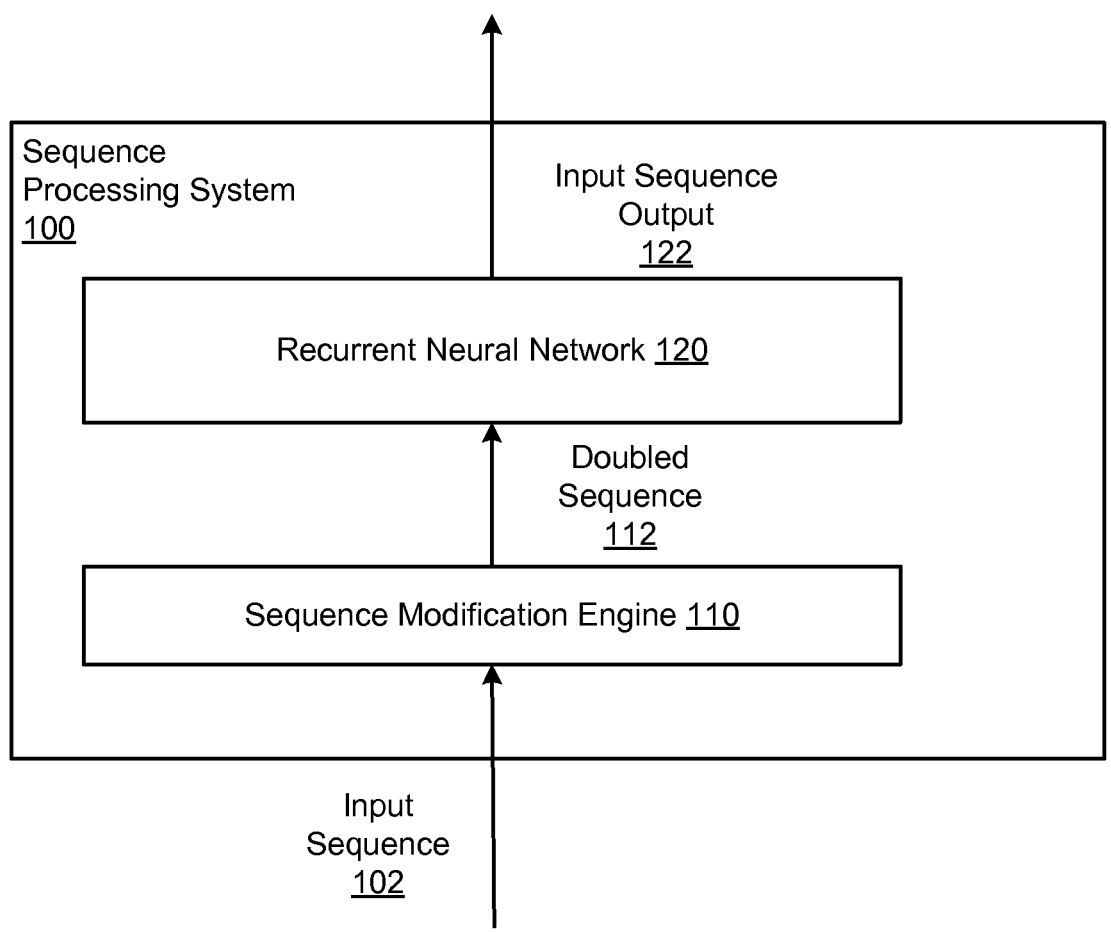
FIG. 1 shows an example sequence processing system.

FIG. 1 shows an example sequence processing system 100. The sequence processing system 100 is an example of a system implemented as computer programs on one or more computers in one or more locations, in which the systems, components, and techniques described below can be implemented.

The sequence processing system 100 generates outputs for input sequences, e.g., an input sequence output 122 for an input sequence 102. In particular, the sequence processing system 100 includes a sequence modification engine 110 and recurrent neural network 120.

The sequence modification engine 110 receives input sequences, e.g., the input sequence 102, and modifies the input sequences before they are provided as input to the recurrent neural network 120. In particular, the sequence modification engine 110 receives an input sequence and generates a doubled sequence, e.g., a doubled sequence 112 from the input sequence 102. Generally, the doubled sequence for a given input sequence includes one instance of the input sequence followed by another instance of the input sequence. Generating doubled sequences is described in more detail below with reference to FIG. 2.

The recurrent neural network 120 is configured to generate outputs for input sequences by processing the doubled input sequences generated by the sequence modification engine 110, i.e., by processing a doubled sequence in place of an input sequence to generate the output for the input sequence.

The recurrent neural network 120 is a neural network that receives a sequence and generates an output, e.g., an output sequence, from the sequence. In particular, a recurrent neural network 120 can use some or all of the internal state of the network from a previous time step in the sequence computing an output at a current time step in the sequence. An example of a recurrent neural network is a long short term (LSTM) neural network that includes one or more LSTM memory blocks. Each LSTM memory block can include one or more cells that each include an input gate, a forget gate, and an output gate that allow the cell to store previous activations generated by the cell, e.g., as a hidden state for use in generating a current activation or to be provided to other components of the LSTM recurrent neural network 120. An example LSTM neural network is described in more detail in "Generating sequences with recurrent neural networks," Alex Graves, available at http://arxiv.org/abs/1308.0850v5.

The recurrent neural network 120 can be configured to receive any kind of digital data input and to generate any kind of score or classification output based on the input.

For example, in some implementations, the recurrent neural network 120 is configured to receive the code of a computer program and to predict the output of the computer program. In particular, the recurrent neural network 120 can receive a doubled sequence that includes a first instance of a sequence of characters from the code of the computer program followed by a second instance of the sequence of characters from the code of the computer program and process the doubled sequence to generate an output, where the output is a predicted output of the computer program. For example, if the computer program is a program that ends with a "print" statement that outputs a value, e.g., a number or a string of characters, the output of the recurrent neural network 120 may identify the most likely value to be output by the computer program.

As another example, if the input to the recurrent neural network 120 is a doubled sequence generated from an input sequence of text in one language, the output generated by the neural network 120 may be a score for each of a set of pieces of text in another language, with each score representing an estimated likelihood that the piece of text in the other language is a proper translation of the input text into the other language.

As another example, if the input to the recurrent neural network 120 is a doubled sequence generated from an input sequence representing a spoken utterance, the output generated by the recurrent neural network 120 may be a score for each of a set of pieces of text, each score representing an estimated likelihood that the piece of text is the correct transcript for the utterance.

Figure 2:
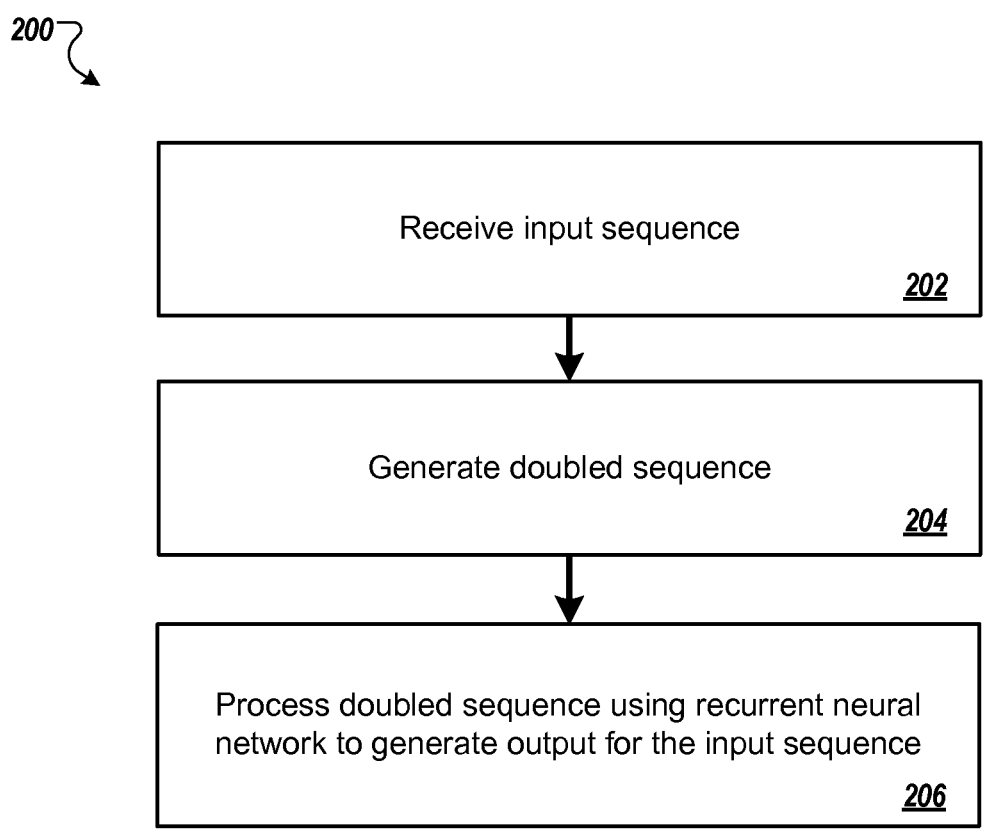
FIG. 2 is a flow diagram of an example process for processing an input sequence to generate an output for the input sequence.

FIG. 2 is a flow diagram of an example process 200 for processing an input sequence to generate an output for the input sequence. For convenience, the process 200 will be described as being performed by a system of one or more computers located in one or more locations. For example, a sequence processing system, e.g., the sequence processing system 100 of FIG. 1, appropriately programmed, can perform the process 200.

The system receives an input sequence (step 202).

The system generates a doubled sequence from the input sequence (step 204). In particular, the system concatenates two instances of the input sequence to generate a doubled sequence that includes one instance of the input sequence followed by another instance of the input sequence. For example, if the input sequence is a sequence of numbers [123456789], the doubled sequence may be the sequence [123456789123456789]. In some implementations, the system inserts a predetermined separator character in the doubled sequence between the first instance of the input sequence and the second instance of the input sequence so that the first instance is separated from the second instance by the separator character in the doubled sequence. For example, if the input sequence is the sequence of numbers [123456789], the doubled sequence may be the sequence [123456789#123456789], with "#" being the separator character.

Optionally, the system also reverses one or both of the instances of the input sequence that are in the doubled sequence when generating the doubled sequence. That is, in some implementations at least one of the instances of the input sequence in the doubled sequence is a reversed instance of the input sequence, i.e., a sequence that includes the same inputs as the input sequence but in reverse order from how the inputs are ordered in the input sequence. For example, if the input sequence is the sequence of numbers [123456789], the doubled sequence may be the sequence [987654321#987654321], [987654321#123456789], or [123456789#987654321].

The system processes the doubled sequence using a recurrent neural network to generate an output for the input sequence (step 206). That is, the system processes the doubled sequence rather than the input sequence using the recurrent neural network to generate the output for the input sequence.

The process 200 can be performed to generate an output for an input sequence for which the desired output, i.e., the output that should be generated by the recurrent neural network for the input sequence, is not known. The process 200 can also be performed on input sequences in a set of training sequences, i.e., a set of input sequences for which the output that should be predicted by the recurrent neural network is known, in order to train the recurrent neural network, i.e., to determine trained values for the parameters of the recurrent neural network. In particular, the process 200 can be performed repeatedly on training sequence selected from a set of training sequences as part of a conventional recurrent neural network training technique, e.g., a backpropagation through time training technique, that determines trained values for the parameters of the recurrent neural network.

In particular, for a given training sequence that is associated with a known output, the system can perform the process 200 to generate a recurrent neural network output for the training sequence. The system can then train the recurrent neural network on the training sequence by adjusting values of the parameters of the recurrent neural network based on an error between the output generated by the recurrent neural network and the known output for the training sequence.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for processing an input sequence using a recurrent neural network to generate an output for the input sequence, the method comprising:
    receiving the input sequence;
    generating a doubled sequence comprising a first instance of the input sequence followed by a second instance of the input sequence, wherein generating the doubled sequence comprises concatenating the first instance of the input sequence and the second instance of the input sequence; and
    processing the doubled sequence using the recurrent neural network to generate the output for the input sequence.

2. The method of claim 1, wherein generating the doubled sequence comprises inserting a separator character between the first instance and the second instance so that the first instance is separated by the separator character from the second instance in the doubled sequence.

3. The method of claim 1, wherein generating the doubled sequence comprises:
    reversing at least one of the first instance or the second instance in the doubled sequence.

4. The method of claim 1, wherein the recurrent neural network is a long short term (LSTM) neural network.

5. The method of claim 1, wherein the input sequence is a training sequence that is associated with a known output, wherein the recurrent neural network has a plurality of parameters, and wherein the method further comprises:
    training the recurrent neural network on the training sequence by adjusting values of the parameters of the recurrent neural network based on an error between the output generated by the recurrent neural network from the doubled sequence and the known output for the training sequence.

6. The method of claim 1, wherein the input sequence is a sequence of characters from code of a computer program, wherein the doubled sequence comprises a first instance of the characters from the code followed by a second instance, and wherein the output generated by the recurrent neural network from the doubled sequence is a predicted output of the computer program.

7. A system comprising one or more computers and one or more storage devices storing instructions that when executed by the one or more computers cause the one or more computers to perform operations for processing an input sequence using a recurrent neural network to generate an output for the input sequence, the operations comprising:
    receiving the input sequence;
    generating a doubled sequence comprising a first instance of the input sequence followed by a second instance of the input sequence, wherein generating the doubled sequence comprises concatenating the first instance of the input sequence and the second instance of the input sequence; and
    processing the doubled sequence using the recurrent neural network to generate the output for the input sequence.

8. The system of claim 7, wherein generating the doubled sequence comprises inserting a separator character between the first instance and the second instance so that the first instance is separated by the separator character from the second instance in the doubled sequence.

9. The system of claim 7, wherein generating the doubled sequence comprises:
    reversing at least one of the first instance or the second instance in the doubled sequence.

10. The system of claim 7, wherein the recurrent neural network is a long short term (LSTM) neural network.

11. The system of claim 7, wherein the input sequence is a training sequence that is associated with a known output, wherein the recurrent neural network has a plurality of parameters, and wherein the method further comprises:
    training the recurrent neural network on the training sequence by adjusting values of the parameters of the recurrent neural network based on an error between the output generated by the recurrent neural network from the doubled sequence and the known output for the training sequence.

12. The system of claim 7, wherein the input sequence is a sequence of characters from code of a computer program, wherein the doubled sequence comprises a first instance of the characters from the code followed by a second instance, and wherein the output generated by the recurrent neural network from the doubled sequence is a predicted output of the computer program.

13. A computer program product encoded on one or more non-transitory storage media, the computer program product comprising instructions that when executed by one or more computers cause the one or more computers to perform operations for processing an input sequence using a recurrent neural network to generate an output for the input sequence, the operations comprising:
    receiving the input sequence;
    generating a doubled sequence comprising a first instance of the input sequence followed by a second instance of the input sequence, wherein generating the doubled sequence comprises concatenating the first instance of the input sequence and the second instance of the input sequence; and
    processing the doubled sequence using the recurrent neural network to generate the output for the input sequence.

14. The computer program product of claim 13, wherein generating the doubled sequence comprises inserting a separator character between the first instance and the second instance so that the first instance is separated by the separator character from the second instance in the doubled sequence.

15. The computer program product of claim 13, wherein generating the doubled sequence comprises:
    reversing at least one of the first instance or the second instance in the doubled sequence.

16. The computer program product of claim 13, wherein the recurrent neural network is a long short term (LSTM) neural network.

17. The computer program product of claim 13, wherein the input sequence is a training sequence that is associated with a known output, wherein the recurrent neural network has a plurality of parameters, and wherein the method further comprises:
   training the recurrent neural network on the training sequence by adjusting values of the parameters of the recurrent neural network based on an error between the output generated by the recurrent neural network from the doubled sequence and the known output for the training sequence.

18. The computer program product of claim 13, wherein the input sequence is a sequence of characters from code of a computer program, wherein the doubled sequence comprises a first instance of the characters from the code followed by a second instance, and wherein the output generated by the recurrent neural network from the doubled sequence is a predicted output of the computer program.

* * * * *

UNITED STATES PATENT AND TRADEMARK OFFICE
CERTIFICATE OF CORRECTION

Page 1 of 1

PATENT NO.         : 10,657,435 B1
APPLICATION NO.    : 14/877096
DATED              : May 19, 2020
INVENTOR(S)        : Sutskever et al.

It is certified that error appears in the above-identified patent and that said Letters Patent is hereby corrected as shown below:

On the Title Page

The first or sole Notice should read --

Subject to any disclaimer, the term of this patent is extended or adjusted under 35 U.S.C. 154(b) by 1224 days.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*